(12) United States Patent
Overath

(10) Patent No.: US 6,475,384 B1
(45) Date of Patent: Nov. 5, 2002

(54) FLOTATION REACTOR AND METHOD FOR FLOTATION

(75) Inventor: Horst Overath, Jülich (DE)

(73) Assignee: Forschungszentrum Julich GmbH, Julich (DE)

( * ) Notice: Subject to any disclaimer, the term of this patent is extended or adjusted under 35 U.S.C. 154(b) by 0 days.

(21) Appl. No.: 09/582,140

(22) PCT Filed: Dec. 16, 1998

(86) PCT No.: PCT/DE98/03733

§ 371 (c)(1),
(2), (4) Date: Jun. 14, 2000

(87) PCT Pub. No.: WO99/32407

PCT Pub. Date: Jul. 1, 1999

(30) Foreign Application Priority Data

Dec. 20, 1997 (DE) .......................................... 197 56 962

(51) Int. Cl.$^7$ .............................. C02F 1/24; B03D 1/14
(52) U.S. Cl. .................. 210/221.2; 210/707; 210/221.1
(58) Field of Search .............................. 210/707, 221.1, 210/221.2

(56) References Cited

U.S. PATENT DOCUMENTS

| 3,192,155 A | * | 6/1965 | Bready |
| 3,505,188 A | * | 4/1970 | Pan |
| 3,799,345 A | * | 3/1974 | Svantesson |
| 3,809,240 A | * | 5/1974 | Savall |
| 4,802,991 A | * | 2/1989 | Miller |
| 5,413,765 A | | 5/1995 | Smith et al. |

FOREIGN PATENT DOCUMENTS

| DE | 24 46 511 A1 | 4/1976 |
| JP | 52111265 | 9/1977 |
| JP | 52126940 | 10/1977 |
| JP | 56118799 | 9/1981 |
| JP | 61129085 | 6/1986 |

OTHER PUBLICATIONS

Kunz, P.(1990), Behandlung von Abwasser, Umweltschutz Entsorgungstechnik,2 Aufl., Vogel Verlag Würzburg, p.85–86.

Hahn, H.H. (1987); Wassertechnologie–Fällung––Flockung–Separation, Springer Verlag Berlin, Heidelberg.

* cited by examiner

Primary Examiner—Thomas M. Lithgow
(74) Attorney, Agent, or Firm—Herbert Dubno

(57) ABSTRACT

The invention relates to a flotation method and a flotation reactor. The invention provides a method and a device, wherein the formation of the gas bubbles needed for flotation are produced by catalytic reaction of a chemical substance, i.e. $H_2O_2$, thereby saving energy and reducing the number of compressors. Flocculation also occurs in a tangential flow in the funnel-shaped expansion (12) of an admission pipe (8) so that a flocculation basin with a stirrer is no longer required.

19 Claims, 1 Drawing Sheet

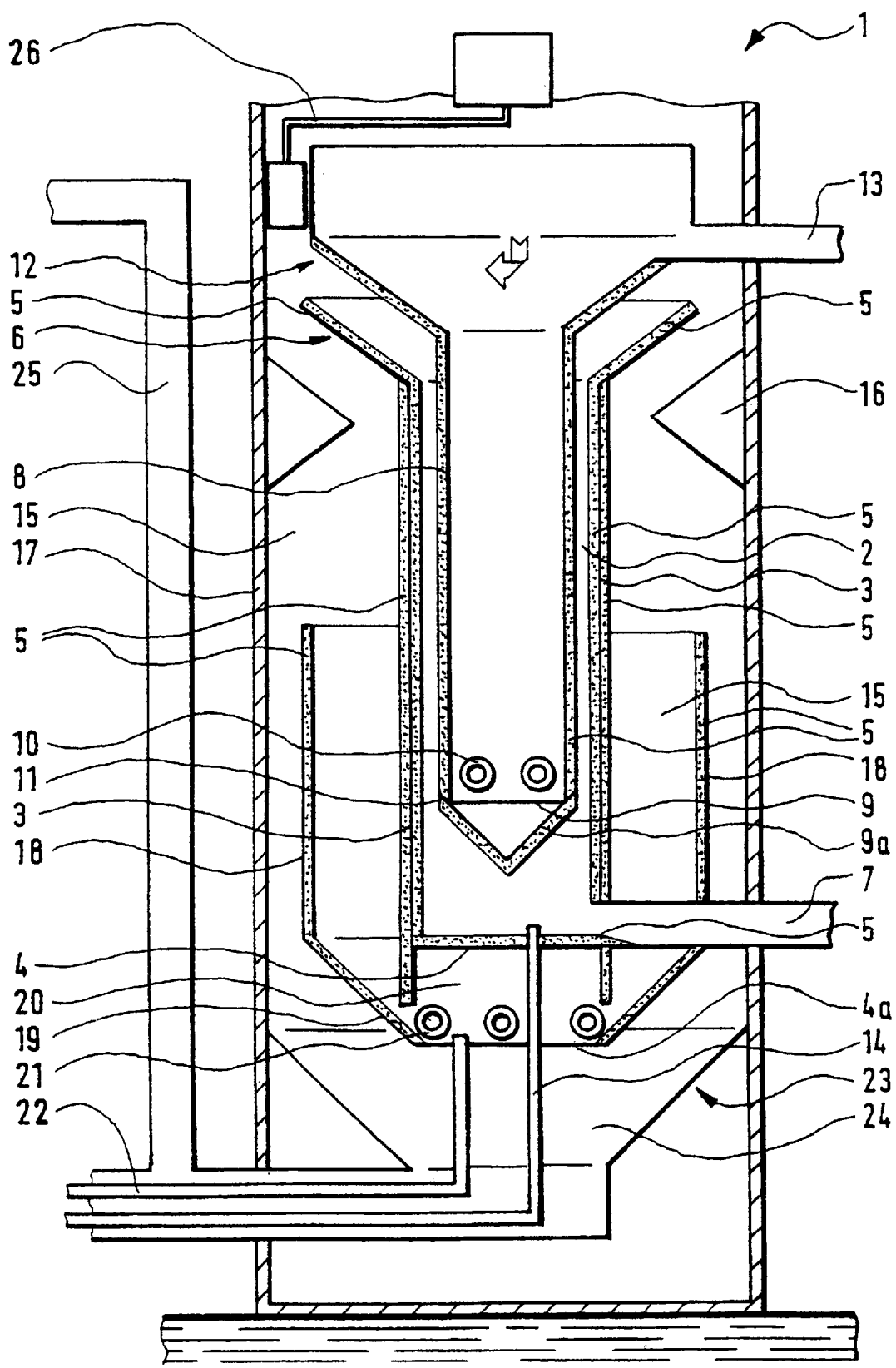

FLOTATION REACTOR AND METHOD FOR FLOTATION

CROSS REFERENCE TO RELATED APPLICATION

This application is a national stage of PCT/DE98/03733 filed Dec. 16, 1998 and based on German application 197 56 962.5 of Dec. 20, 1997 under the International Convention.

FIELD OF THE INVENTION

The invention relates to a flotation reactor and a method of flotation.

BACKGROUND OF THE INVENTION

According to the state of the art, various flotation processes are known. Thus in the publication "Umweltschutz Entsorgungstechnik" of Prof. Dr. P. Kunz 2. Auflage 1990 Vogel Book Publishing Co. under the heading "Treatment of Waste Water" on pages 85–86, electroflotation and pressure-expansion flotation are disclosed.

These processes are also known from the work "Wassertechnologie—Fallung, Flockung, Separation" of Hermann H. Hahn of Springer-Verlag Berlin, Heidelberg 1987.

In pressure-expansion flotation, water under pressure is charged with gas and conducted into a flotation chamber. Upon pressure relief, there is an expansion of the gas in the liquid, the gas bubbles out and flotates the solids to be separated from the liquid which can be recovered from the surface of the liquid.

In electroflotation, a gas rising in the liquid is generated by electrolysis and flotates the solids to be separated.

Both processes are used in an industrial scale, but have significant drawbacks. Thus expansion flotation requires an expensive and pressurizable apparatus.

As a result of the rapid pressure expansion, the gas formation is rapid, as a result of which turbulence arises which can again break up the flocculate.

In both processes, the flocculating step must precede the flotation step in which the solids precipitate out in a flocculation basin and wherein the solids agglomerate to larger flocculates.

Electroflotation gives rise to high operating costs because of the high current requirements. Both processes have a high energy consumption.

OBJECT OF THE INVENTION

It is therefore the object of the invention to provide a process and an apparatus which is characterized by a substantially-reduced energy consumption and can avoid the need for expensive and dear apparatus and in which a breakup of the flocculate by turbulence is suppressed.

SUMMARY OF THE INVENTION

The object is achieved with a flotation reactor with a flotation space, an inlet for the flotation liquid and a gas source, characterized in that the gas source is a catalyst which is brought into contact with a substance which is converted to a gas thereby.

With the method and the apparatus according to the invention it is possible directly to carry out flotation of solids in an energy-conserving manner at low apparatus cost. The danger that flocculates will be destroyed by the flotation is very low. The flotation is effected with very small gas bubbles and is highly uniform and of low turbulence.

The flotation reactor can have its flotation space coated with the catalyst. The catalyst can have at least one of its components selected from the group of manganese dioxide and active carbon. The flotation reactor can have means at its bottom region for introducing a substance which is converted on the catalyst to the gas. The flotation reactor can also have in the bottom region means for introducing the flotation liquid.

The means for introducing the water for flotation can be a downwardly-directed pipe which at its lower end or in its lower third, has outlet openings and which widens upwardly in the form of a funnel. At the funnel, means can be provided for tangentially admitting the flotating liquid. The flotation reactor can have a downwardly-directed tube and a funnel-shaped converging narrowing. The pipe beneath the outlet openings can have a bottom. The funnel-shaped narrowing can be so configured that it extends above the pipe cross section so that no rising floc or gas bubbles can enter the outlet opening.

The walls of the flotation space can widen upwardly in the form of a funnel.

The aforementioned flotation chamber can be located in a further surrounding flotation chamber and the walls of the flotation chamber can be coated with a catalyst which catalyzes a chemical reaction from which a gas is produced.

In this embodiment the flotation space in its lower region has means for introducing a substance which forms a gas by the chemical reaction. The flotation space can be so constructed that it surrounds the first-mentioned flotation space with its wall radially symmetrically whereby it forms below the means for introducing a substance producing a gas by the chemical reaction, a closed vessel which runs to a central incline and whereby the wall of the flotation space leaves free an intermediate space with the wall of the flotation reactor outside the funnel means can be provided for concentration of gas bubbles in the flotation space. This means for concentrating the gas bubbles can be a conical ring.

The second flotation space can be provided at its bottom in the form of an incline for the discharge of the flotated liquid which can be effected through a U-shaped pipe. The U-shaped pipe can be telescopingly elongatable.

The flotation reactor can have means for separating the flotate.

The flotation method is characterized in that a chemical reaction is carried out for producing gas bubbles. The chemical reaction can be a catalytic reaction, for example, a decomposition of hydrogen peroxide to water and oxygen. As the catalyst, manganese dioxide and/or active carbon can be used.

The substance which decomposes to the gas in the chemical reaction can be admitted to the lower region of a flotation space. The substance to be flotated can be supplied in a tangential flow and can then flow in a downwardly-directed stream.

The liquid quantity leaving the flotation reaction is preferably matched to the flotation liquid at the inlet to the flotation reactor.

BRIEF DESCRIPTION OF THE DRAWING

The sole FIGURE of the drawing shows an apparatus according to the invention in a schematic form.

SPECIFIC DESCRIPTION

In the drawing a flotation reactor 1 is illustrated which has a first flotation space 2 whose walls 3 and bottom 4 are coated on their inwardly-directed sides with a catalyst 5. The flotation space 2 is widened upwardly in the form of a funnel 6 and, provided at its lower end with an inlet 7 for the solids to be flotated in a liquid. In the flotation space 2, as a means for introducing the solids to be flotated, there is a vertically downwardly directed pipe 8 which at its lower end is formed with a bottom 9 and is closed with a funnel-shaped narrowing 9a. In the lower region of the tube 8 there are outlet openings 10 for the material to be flotated. The funnel-shaped narrowing 9a forms means for conducting and guiding a flowing liquid in the form of a flange 11.

The pipe 8 widens at its upper end also in the form of a funnel 12 and has a further inlet 13 for the solids to be flotated in a liquid.

The flotation space 2 comprises a supply conduit 14 for $H_2O_2$ which opens at the bottom. The first flotation space 2 is located in a second flotation space 15 which is comprised of a conical ring 16 serving as a means for concentrating the gas bubbles. The second flotation space 15 is defined substantially by the wall 3 of the first flotation space 2, the upper region of the reactor wall 17, the conical ring 16, the funnel 6 and, in its lower region, by the first flotation space and is bounded by the upwardly open wall 18 which is closed by the bottom 4a and runs downwardly inwardly toward the center via an inclined wall 19.

The inclined wall 19, together with the bottom 4a of the first flotation space closes a chamber 20 which is provided with openings 21 traversed by a substance which liberates a gas by chemical reaction and the supply pipe 22 for this substance. The second flotation space 15 is also coated internally with the catalyst 5. The coatings cover the outwardly-directed side of the wall 3 of the flotation space 2 as well as the inwardly-turned side of the wall 18 and the incline 19. The conical ring 16 as well as regions of the reactor wall 17 can also be coated with catalyst.

The flotation reactor 1 runs conically below the incline 19, in its turn, into an incline 23 which surrounds the supply ducts 14 and 22. The space 17 enclosed by the incline 23 extends outside the flotation reactor 1 in the form of a telescopingly elongatable U tube 25. Between the wall 17 and the funnel 12 a rotating reamer of flotated solids 26 is provided.

In operation, the water charged with the solids to be flotated, together with a flocculating agent, is fed via the inlet 13 into the funnel 12 in a tangential flow. By the introduction of this suspension in the form of a tangential flow, flocculation is so optimized that the provision of a flocculating basin upstream of the reactor can be avoided since the flocculent can ripen during the circular movement. The solids to be flotated agglomerate during the circular movement in the funnel 12 especially well to lodge downwardly sinking flotatable flock.

In the funnel, the water with the flotatable solid passes downwardly through the pipe 8. The water emerges from the pipe 8 at the outlet openings 10 and thus flows into the first flotation space 2 which is coated with a catalyst 5.

As the catalyst 5, active carbon 4 magnesium dioxide can be used. $H_2O_2$ is fed through the supply line 14, preferably at the lowest point in the flotation space 2. The $H_2O_2$ decomposes on the catalyst surfaces of the catalyst coated walls 3, pipe 8 and bottom 4 to water and oxygen. As a result of this decomposition, extremely fine gas bubbles are formed which calmly and with low turbulence move upwardly in the flow of water. This calm movement of the gas bubbles is responsible for the transport of the flocculated solids, without breaking them up, and especially effective flotation.

With the upwardly-directed flow of the flotation water, the flotation path travels along the narrowing 9a as well as along the flange 11. As a result, the reentry of flocculated solids and gas bubbles in the inlets 10 is prevented.

The bottom 9 provided at the lower region of the pipe 8 prevents the floc from settling in the narrowing 9a and fouling the latter. The water involved in the process passes upwardly out of the first flotation space 2 along its path through the funnel-shaped opening. At this location, the rotation reamer can separate the solids of the flocculated solid materials. Already at this stage, the flotation results are very good.

For the case in which some of the floc below the funnel 6 settles, there is effected a further introduction of $H_2O_2$ into the second flotation space. In this space the further $H_2O_2$ comes into contact with the walls 18 and incline 19 which are coated with catalyst, the further $H_2O_2$ being admitted through the openings 21 in the lower region of the second flotation space. The resulting rising oxygen flotates the floc in the same way as in the first flotation space from the liquid directed downwardly and passing between the reactor wall 17 and wall 18. Since the lower region of the second flotation space 15 between the wall 18 and the first flotation space 2 represents an especially calm zone, the $H_2O_2$ is not diluted by flow and the flotation is especially effective.

To amplify the flotation effect, there is found in the upper region of the second flotation space 15, a conical ring 16 which effects a constriction of the flow cross section and thus a concentration or densification of the upwardly flowing oxygen bubbles. An additional concentration of the oxygen bubbles arises through the accumulation of the gas bubbles from the first and second flotation spaces 2 and 15 at the location at which the funnel 12 ends. From there, the flotation sludge passes to the liquid surface and can be removed. The excellent flotation results of the method of the invention is especially significant since it enables a good and plentiful attachment of gas bubbles to the particles or bloc. The conical ring 16, in an especially preferred embodiment of the invention is height adjustable so that as a result, a further reduction or spread of the flowthrough cross section is possible between the funnel 6 and the conical ring 16.

The water freed from solids flows downwardly through the space 24 and the U tube 25 from the flotation reactor 1. Because of the configuration of the incline 23 at the outlet region, the liquid subjected to flotation prevents the settling of particles in space 24 so that even with very long operation durations, there is no plugging. The U tube 25 is telescopingly elongatable upwardly. As a result, an increased liquid level in the pipe 8 or the funnel 12 can be compensated when the liquid quantity traversing the flotation reactor must be increased for example because of an increased purification requirement per unit time. The water level in flotation reactor 1 can thus be optimally adjusted for separation of the flotation sludge at different water throughputs.

In the flotation of solids which have a tendency to rise in the liquid, a charging of the first flotation space 2 with the liquid to be flotated through inlet 7 is possible. In this case, the flotation can be carried out in a flocculation basin provided ahead of the apparatus but not shown in the drawing.

The method of the invention and the apparatus operates especially economically. Thus with an $H_2O_2$ concentration of 0.06% over a duration of 24 hours, oxygen is continuously released. The operation of the second flotation space 15, arranged below the first flotations space, is flocculated and depends upon the degree of charging of the apparatus of the invention with flocculent.

If the process is carried out with a catalytic reaction which produces oxygen as the gas, according to a feature of the invention process, an additional enrichment of for example denitrification water from a clarifier stage of a sewage treatment apparatus with oxygen is the result. However, it is also possible to use another chemical reaction which generates other flotation gases. Thus a catalytic reaction can be used in which, for example, nitrogen is formed and which can utilize a decomposition of sodium carbonate on manganese dioxide with the formation of $CO_2$ for flotation.

In the fabrication of the flotation reactor 1 according to the invention the catalyst can be applied by conventional adhesive to the walls in that catalyst powder can be spread onto walls to which an adhesive is applied and before the adhesive hardens. It will be self-understood that finished catalyst plates can also be applied in the reactor.

The supply of a flocculating agent is flocculative and depends upon the conditions present at the time. As a rule, polyaluminumchloride (PAC) or $FeCl_3$ is used as the flocculating agent. The supply of the liquid to be flotated through the inlet 7 of pipe 8 is so effected that the flocculate sludge does not accumulate at the center of the flotation space 2, thereby improving the space utilization.

The substance needed for the catalytic production of gas, like $H_2O_2$, is preferably supplied at the lowest point in the flotation spaces 2 and 15 since, in this case, the stretch available for flotation is a maximum. The openings 10 and 21 can however also be provided at locations spaced above the bottom. A foreshortening of the pipe 8 and a related positioning of outlet openings 10 for the flotating liquid upwardly, gives rise to the formation of a quiescent zone in the lower entry region for $H_2O_2$ so that at this location scarcely any dilution of the $H_2O_2$ occurs.

The catalyst coated elements in the form of pipes or plates can also be built into previously made flotation reactors. They can, depending upon the application, replace the process technology expensive pressure expansion or electroflotation in a cost-effective manner or can be used to complement existing apparatus. The range of applications includes for example the treatment of drinking and waste water in municipalities as well as water treatment in the industrial field. Furthermore, the method and the apparatus of the invention can be used as a preliminary stage for reducing the load on filters.

What is claimed is:

1. A flotation reactor comprising:
   a flotation reactor housing having respective walls;
   inner and outer walls in said reactor defining between them a narrow upwardly extending flotation space opening into a wider outlet for flotated solids;
   at least one inlet for a flotation liquid and for flotatable solids communicating with said flotation space at a lower portion thereof whereby the flotation liquid and flotatable solids rise between said inner and outer walls in said space;
   means for introducing into said reactor housing a reactive liquid which flows along said walls and is catalytically activatable to liberate a flotation-promoting gas to effect flotation of said solids in said flotation liquid whereby flotated solids are formed; and
   a catalyst fixed to and coating at least some of said walls and capable of activating said reactive liquid to produce said flotation-promoting gas.

2. The flotation reactor defined in claim 1, wherein said catalyst is selected from the group which consists of activated carbon and manganese dioxide.

3. The flotation reactor defined in claim 2 wherein said inner and outer walls are concentric cylinders and said means for introducing said reactive liquid includes a pipe opening upwardly in said housing at a bottom thereof generally centrally below said cylinders.

4. The flotation reactor defined in claim 3 wherein said at least one inlet includes a downwardly extending duct opening generally centrally at a lower portion of said housing with a plurality of openings in a lower third of said duct and widening at an upper end into a funnel.

5. The flotation reactor defined in claim 4, further comprising a supply line communicating tangentially with said funnel for supplying said flotation liquid and said solids thereto.

6. The flotation reactor defined in claim 4 wherein said duct has a lower end formed with a downward conical convergence below said openings.

7. The flotation reactor defined in claim 6 wherein said duct has a bottom below said openings and above said downward conical convergence.

8. The flotation reactor defined in claim 6 wherein said conical convergence extends outwardly beyond said openings to prevent rising gas bubbles and flocculate from entering said openings.

9. The flotation reactor defined in claim 3 wherein said outer wall is provide with a funnel at an upper end thereof forming said wider outlet.

10. The flotation reactor defined in claim 9 wherein said funnel opens into another flotation chamber in said housing surrounding said outer wall.

11. The flotation reactor defined in claim 10 wherein said other flotation chamber is defined between walls coated with a gas-generating catalyst.

12. The flotation reactor defined in claim 11 wherein said means for introducing said reactive liquid includes a pipe opening into said other flotation chamber at a bottom thereof.

13. The flotation reactor defined in claim 12 wherein said other flotation chamber is formed with a wall coaxially surrounding said outer wall and spaced inwardly from a wall of said housing, and having a downwardly converging conical bottom.

14. The flotation reactor defined in claim 13, further comprising a concentrator for gas bubbles between said outer wall and said housing and below said funnel.

15. The flotation reactor defined in claim 14 wherein said concentrator is a conical ring.

16. The flotation reactor defined in claim 13, further comprising a conical bottom for said other flotation chamber for discharging a flotated product.

17. The flotation reactor defined in claim 16, further comprising a U-tube for discharging said flotated product from said conical bottom.

18. The flotation reactor defined in claim 17 wherein said U-tube is telescopingly elongatable.

19. The flotation reactor defined in claim 16, further comprising means for separating the flotated product.

\* \* \* \* \*